Sept. 18, 1934.  C. F. MENDEZ  1,973,822

METHOD OF AND APPARATUS FOR PHOTOGRAPHING MOVING OBJECTS

Filed June 22, 1931  4 Sheets-Sheet 1

Inventor
Ciro Fidel Mendez
By Ogle R. Singleton.
Attorney

Sept. 18, 1934.     C. F. MENDEZ     1,973,822
METHOD OF AND APPARATUS FOR PHOTOGRAPHING MOVING OBJECTS
Filed June 22, 1931     4 Sheets-Sheet 2
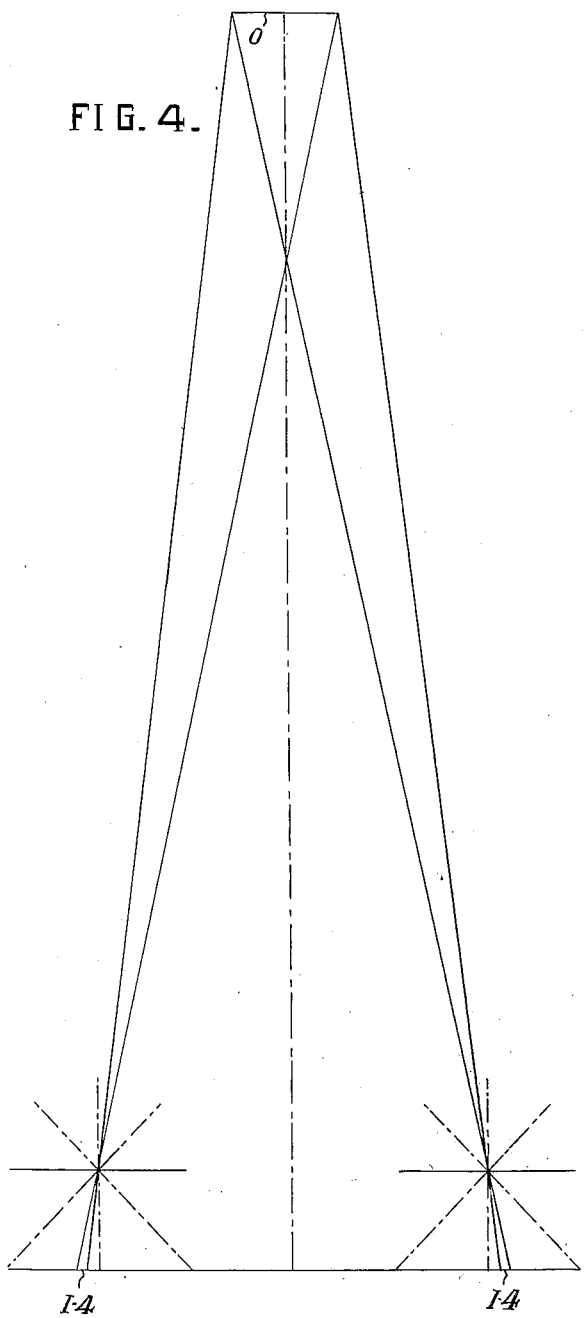
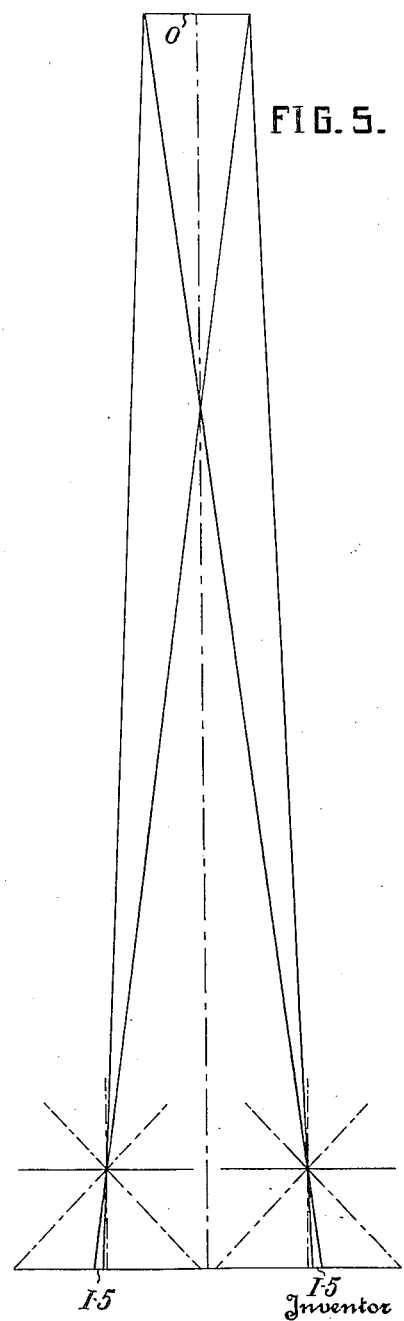

Sept. 18, 1934.   C. F. MENDEZ   1,973,822
METHOD OF AND APPARATUS FOR PHOTOGRAPHING MOVING OBJECTS
Filed June 22, 1931   4 Sheets-Sheet 3
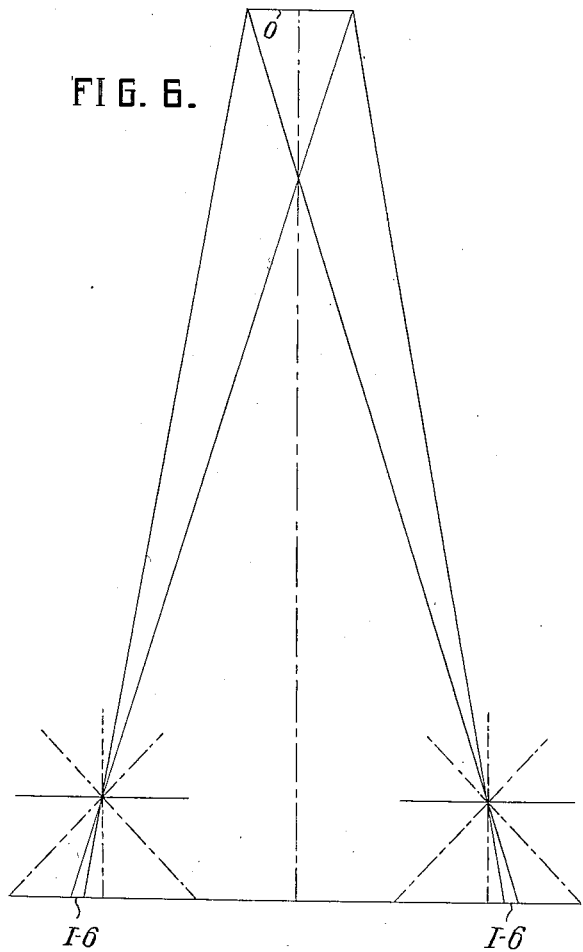
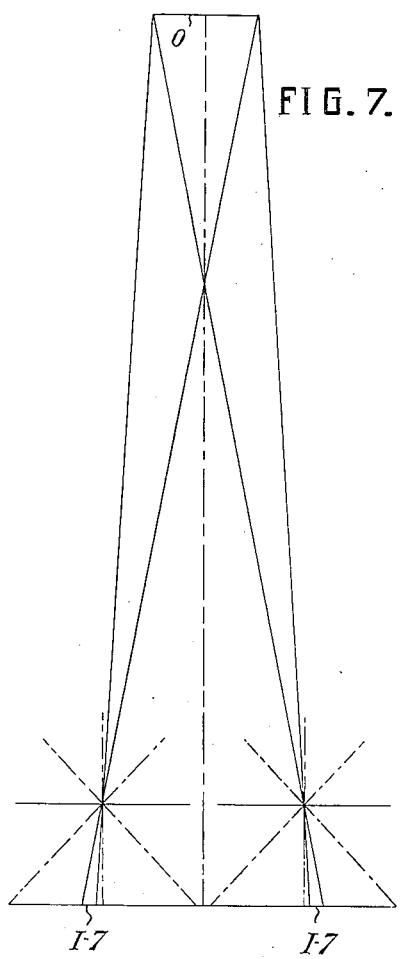

Sept. 18, 1934. C. F. MENDEZ 1,973,822
METHOD OF AND APPARATUS FOR PHOTOGRAPHING MOVING OBJECTS
Filed June 22, 1931 4 Sheets-Sheet 4
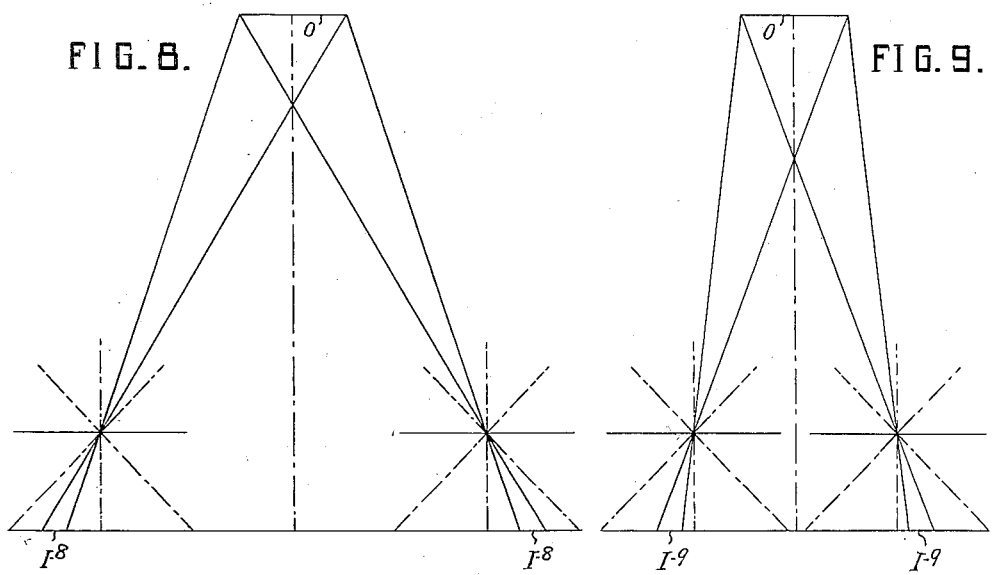
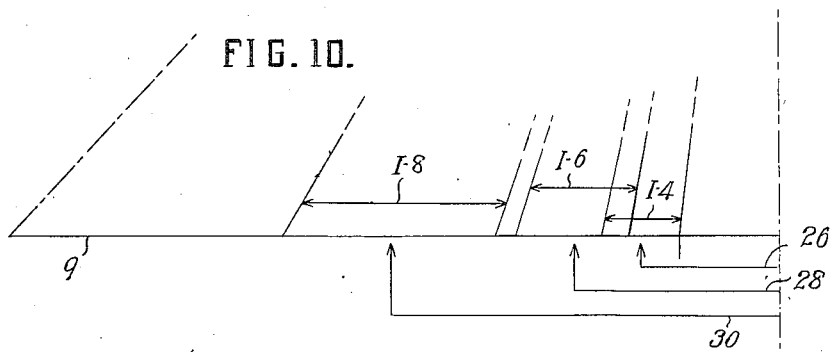
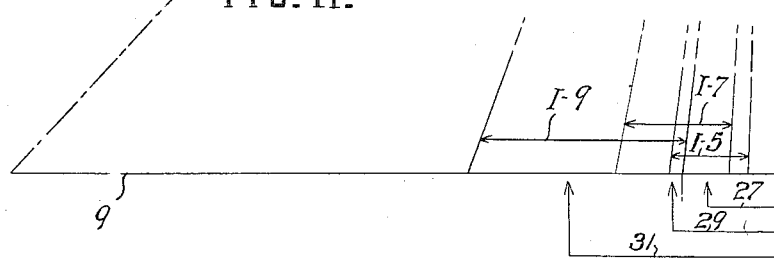
Inventor
Ciro Fidel Mendez
By Ogle R. Singleton
Attorney Patented Sept. 18, 1934

1,973,822

UNITED STATES PATENT OFFICE 1,973,822

METHOD OF AND APPARATUS FOR PHOTOGRAPHING MOVING OBJECTS

Ciro Fidel Mendez, New York, N. Y.

Application June 22, 1931, Serial No. 546,077

5 Claims. (Cl. 88—16.6)

My invention relates to a new and useful improvement in method of and apparatus for photographing moving objects to produce stereoscopic pictures thereof. My apparatus is a binocular camera in which the two lenses are focalized on the same object so as to produce two similar pictures of the same object which when superimposed will give a stereoscopic effect to the picture. I am aware that binocular cameras have been used for this purpose, but all such cameras having a fixed distance between the lenses have this defect, namely, that objects within a certain distance from the lenses produce images on the two films which are so far out of register as to cause confusion when the films are superimposed. It is obvious that this defect can be overcome by making the lenses relatively movable, since the degree in which the images are in or out of register depends upon the distance between the lenses.

I have found that depending upon the distance from the lenses of an object to be photographed, the lenses must be spaced apart at a definite distance to produce upon the films images which are out of register to the precise degree to give the stereoscopic effect.

My improved method, then, is to progressively vary the distance between the lenses of my camera according to the movement of the object being photographed, so that the photographic field will be so maintained as to produce the best stereoscopic effect. In other words, by separating the lenses of my camera to the fullest extent possible with my improved construction, I can photograph the moving object when it is at a considerable distance from the lenses, and, by reason of the distance from the lenses and the separation of the lenses, I produce the best stereoscopic effect, and then, as the object moves toward the camera, I reduce the distance between the lenses so that at no time shall the images of the object be so far out of register as to cause confusion.

In the drawings:

Fig. 4 is a diagrammatic view indicating the images on the films of a distant object, when the lenses of the camera are widely separated.

Fig. 5 is a diagrammatic view indicating the images on the films of a distant object, when the lenses of the camera are brought closely together.

Fig. 6 is a diagrammatic view indicating the images on the films of a nearer object, when the lenses of the camera are widely separated.

Fig. 7 is a diagrammatic view indicating the images on the films of a nearer object, when the lenses of the camera are brought closely together.

Fig. 8 is a diagrammatic view indicating the images on the films of an object quite close to the camera, when the lenses of the camera are widely separated.

Fig. 9 is a diagrammatic view indicating the images on the films of an object quite close to the camera, when the lenses of the camera are brought closely together.

Fig. 10 is a diagrammatic view, quite enlarged, indicating on one film, for the purpose of comparison, the image of the distant object (left image in Fig. 4), the image of the nearer object (left image in Fig. 6), and the image of the object quite close to the camera (left image in Fig. 8), as such images are produced when the lenses of the camera are widely separated.

Fig. 11 is a diagrammatic view, quite enlarged, indicating on one film, for the purpose of comparison, the image of the distant object (left image in Fig. 5), the image of the nearer object (left image in Fig. 7), and the image of the object quite close to the camera (left image in Fig. 9), as such images are produced when the lenses of the camera are brought closely together.

Figure 1:
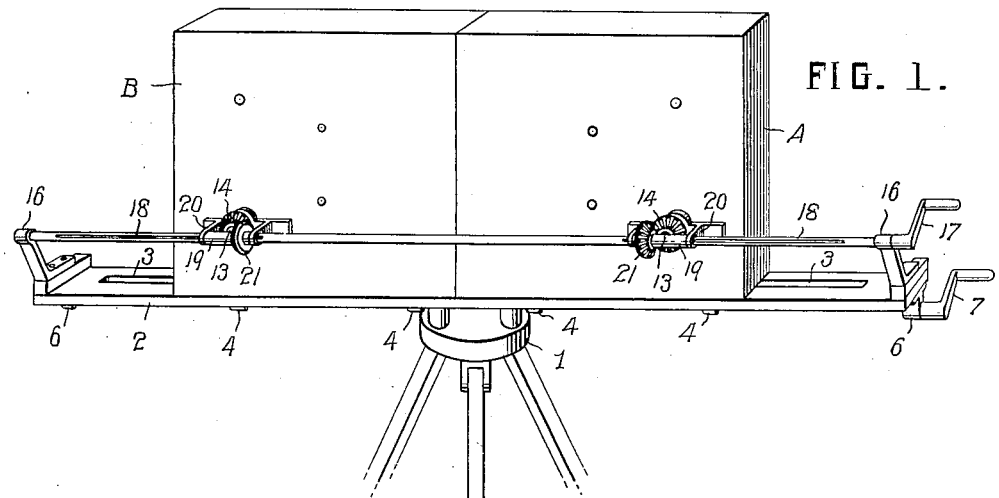
Fig. 1 is a perspective view of my apparatus.
Figure 2:
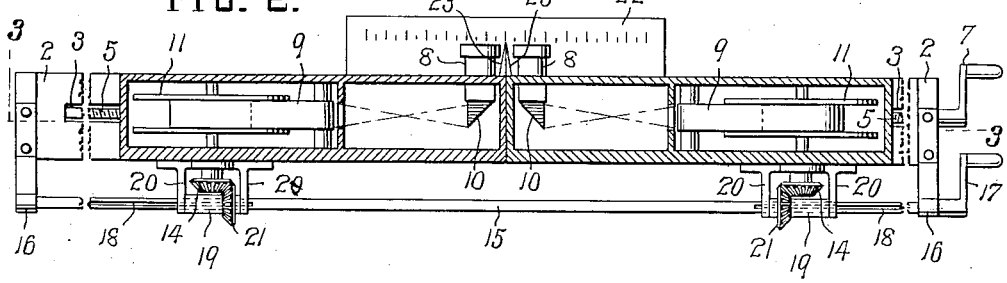
Fig. 2 is a horizontal section on the line 2—2 of Fig. 3.
Figure 3:
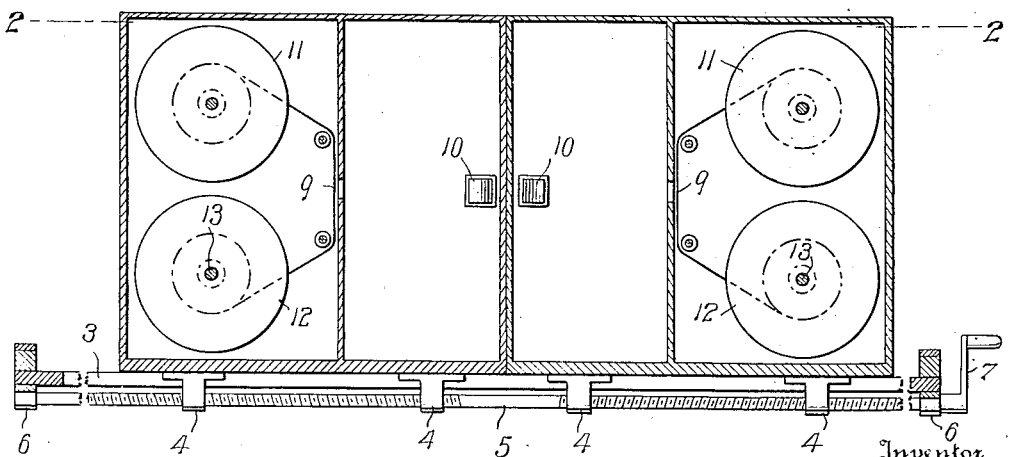
Fig. 3 is a vertical section on the line 3—3 of Fig. 2.

As illustrated in Figs. 1, 2 and 3 of the drawings, my apparatus has any suitable form of support 1 on which is mounted the base 2 on which are slidably mounted the cameras A and B. The base 2 has the longitudinal slot 3 through which depend from the bottom of the cameras A and B the lugs 4 through which is threaded the rotatable shaft 5 mounted in the journals 6 on the bottom of the base 2 and having the operating crank 7. It is obvious from the foregoing description of the details of construction that rotation of the shaft 5 by its crank 7 will cause the cameras A and B to move along the base 2, toward or away from one another.

It is to be understood that I mount the cameras A and B so that the lenses thereof shall be maintained in the same plane so that their axes shall remain parallel.

It is also to be understood that the cameras A and B are of the usual type of moving picture cameras, and that I have illustrated in the drawings only such portions of their structure as are required to disclose my invention.

Since it is essential that the lenses of the two cameras be brought as close together as possible, I have indicated the lenses in the lens holders 8 at the adjacent edges of the cameras A and B, the films 9 being positioned at right angles to the lenses and reflectors 10 being used. The films 9 are carried on the usual form of spools 11 and 12. The shafts 13 of the spools 12 have gears 14. I provide a shaft 15 carried in journals 16 on the base 2 and provided with a crank 17 and longitudinal key-ways 18 in which are disposed keys on sleeves 19 about the shaft 15 and between the ends of forks 20 suitably mounted on the sides of the cameras A and B. Gears 21 on the sleeves 19 mesh with the gears 14 of the cameras A and B.

It is obvious from the foregoing description of the details of construction that rotation of the shaft 15 by its crank 17 will cause rotation of the spools 12 to wind the films 9 for the photographing operation, and that cameras A and B will operate synchronously. By reason of my construction, the cameras A and B can be continuously operated synchronously, while the relative positions of the cameras A and B are being altered by the mechanism heretofore described.

I provide on the base 2 a suitable gauge 24 and on the cameras A and B pointers 25 to co-act with this gauge 24 to indicate the relation of the camera A to the camera B.

I will now describe, by reference to Figures 4 to 11 inclusive, the production of images of objects at various distances from the camera, indicating the widely differing positions of such images on the films according to the distances between the lenses of the camera.

It is to be noted that in all of the illustrations which I use the focal length of the camera is the same, the sizes of the lenses and films are the same, and the size of the object is the same.

It is also to be noted that in Figures 4, 6 and 8 the lenses are indicated as widely separated and are shown at the same distance of separation in these three figures; and that in Figures 5, 7 and 9 the lenses are indicated as brought closely together and are shown at the same distance of separation in these three figures.

It is also to be noted that in Figures 4 and 5 the object is shown at the same distance from the camera, viz, quite distant; that in Figures 6 and 7 the object is shown at the same distance from the camera, viz, somewhat nearer; and that in Figures 8 and 9 the object is shown at the same distance from the camera, viz, quite close.

As illustrated in Fig. 4, the images I—4 of the object O are placed upon the films 9 at such distances from the middle of the films 9, indicated by the arrow 26 in Fig. 10, as to cause the two images I—4 to be out of register to the precise degree desired to produce the stereoscopic effect.

As illustrated in Fig. 5, the images I—5 of the object O are placed upon the films 9 at such distances from the middle of the films 9, indicated by the arrow 27 in Fig. 11, as to cause the two images to be out of register to a degree which is insufficient to produce the stereoscopic effect.

Thus it will be obvious that to produce the desired effect when photographing the object O at the distance from the camera illustrated in Figures 4 and 5, the lenses of the camera must be separated from the position shown in Fig. 5 to assume the relative positions indicated in Fig. 4.

As illustrated in Fig. 6, the images I—6 of the object O are placed upon the films 9 at such distances from the middle of the films 9, indicated by the arrow 28 in Fig. 10, as to cause the two images to be so far out of register as to produce confusion and lose the stereoscopic effect.

As illustrated in Fig. 7, the images I—7 of the object O are placed upon the films 9 at such distances from the middle of the films 9, indicated by the arrow 29 in Fig. 11, as to cause the two images to be out of register to a degree which is insufficient to produce the stereoscopic effect.

Thus it will be obvious that to produce the desired effect, when photographing the object O at the distance from the camera illustrated in Figures 6 and 7, the lenses of the camera must be positioned at a distance less than that shown in Fig. 6 and greater than that shown in Fig. 7.

As illustrated in Fig. 8, the images I—8 of the object O are placed upon the films 9 at such distances from the middle of the films 9, indicated by the arrow 30 in Fig. 10, as to cause the two images to be so far out of register as to produce confusion and lose the stereoscopic effect.

As illustrated in Fig. 9, the images I—9 of the object O are placed upon the films 9 at such distances from the middle of the films 9, indicated by the arrow 31 in Fig. 11, as to cause the two images to be out of register to the precise degree desired to produce the stereoscopic effect.

Thus it will be obvious that to produce the desired effect when photographing the object O at the distance from the camera illustrated in Figures 8 and 9, the lenses of the camera must be moved from the positions indicated in Fig. 8 to assume the relative positions indicated in Fig. 9.

Having described my invention, what I claim is:

1. The method of producing stereoscopic motion pictures which consists in synchronously operating two relatively movable motion picture cameras, both of which are focused upon the objects being photographed, and moving the cameras relative to one another during their operation, according to the distance from the cameras of the objects being photographed, so that the distance between the lenses during the operation of the cameras will be progressively varied so that the images of those objects nearest to the lenses will be not so far out of register as to cause confusion when the two sets of images are superimposed.

2. In an apparatus for producing motion pictures, the combination of a base having a longitudinal slot; two motion picture cameras slidably mounted on said base; threaded lugs on said cameras extending through said slot; a shaft journaled on said base, threaded through said lugs and having a crank; a second shaft journaled on said base and having a crank and key-ways; two sleeves slidable on said second shaft, each having a key fitted in one of said key-ways; a fork mounted on each camera and enclosing one of said sleeves; and gears mounted on said sleeves and each meshed with a gear on the operating shaft of one of said cameras.

3. In an apparatus for producing motion pictures, the combination of a base having a longitudinal slot; two motion picture cameras slidably mounted on said base; threaded lugs extending from the bottom of each camera through said slot; bearings depending from the ends of said base; a shaft journaled in said bearings, threaded through said lugs, and having a crank on one end; brackets on said base, each having a bearing; a second shaft journaled in said bracket-bearings, having two key-ways and provided at its end with a crank adjacent the crank on the first shaft; a fork mounted on each camera and having bearings in which is journaled the second shaft; a sleeve on said second shaft confined between the ends of each of said forks and provided with a key fitted in one of said keyways; a gear on each of said sleeves; and a gear on the operating shaft of each camera meshing with one of said sleeve-gears.

4. The method of producing stereoscopic motion pictures which consists in photographing moving objects with two synchronously operating cameras, and moving the cameras relative to one another during their operation, so as to vary the distance between their respective axes while maintaining said axes in parallelism.

5. The method of producing stereoscopic motion pictures which consists in synchronously operating two motion picture cameras, and moving said cameras relative to one another, according to the distance of the cameras from the object being photographed, so that the distance between the lenses of the cameras will be so maintained that the images of the object will be in that degree of out-of-register relation as not to cause confusion when the two sets of images are superimposed.

CIRO FIDEL MENDEZ.